United States Patent
Wang et al.

(10) Patent No.: US 12,104,949 B1
(45) Date of Patent: Oct. 1, 2024

(54) CIRCUITS AND METHODS FOR DIGITAL DC STABILIZATION OF OPTICAL RECEIVERS

(71) Applicant: XILINX, INC., San Jose, CA (US)

(72) Inventors: Zhaowen Wang, Sunnyvale, CA (US); Mayank Raj, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 18/128,397

(22) Filed: Mar. 30, 2023

(51) Int. Cl.
G01J 1/44 (2006.01)

(52) U.S. Cl.
CPC ............ *G01J 1/44* (2013.01); *G01J 2001/446* (2013.01)

(58) Field of Classification Search
CPC .............................. G01J 1/44; G01J 2001/446
See application file for complete search history.

(56) References Cited

U.S. PATENT DOCUMENTS

| 9,882,539 B1 * | 1/2018 | Shringarpure ....... H04B 10/616 |
| 10,797,658 B1 | 10/2020 | Raj |
| 11,005,572 B1 | 5/2021 | Chiang et al. |
| 2020/0403583 A1 * | 12/2020 | Zhang ................. H03F 3/45183 |

OTHER PUBLICATIONS

Raj, M., et al. "Design of a 50-GB/s Hybrid Integrated Si-Photonic Optical Link in 16-nm FinFET," IEEE Journal of Solid-State Circuits 55 (2020): 1086-1095.

* cited by examiner

*Primary Examiner* — Jennifer D Bennett
*Assistant Examiner* — Erin R Garber
(74) *Attorney, Agent, or Firm* — Patterson + Sheridan, LLP

(57) ABSTRACT

An integrated circuit (IC) device includes a controller circuitry having an input connected to a photodiode of an optoelectronic circuitry and an output connected to a biasing circuitry, the biasing circuitry having an input connected to the output of the controller circuitry, the controller circuitry configured to transmit a transimpedance control signal code to the biasing circuitry configured to cause the biasing circuitry to offset a DC current component of the output of the photodiode.

17 Claims, 4 Drawing Sheets

CIRCUITS AND METHODS FOR DIGITAL DC STABILIZATION OF OPTICAL RECEIVERS

TECHNICAL FIELD

Examples of the present disclosure generally relate to a locked loop for optoelectronic elements having a current-dependent response.

BACKGROUND

Optical devices have been used for communications, such as over a fiber optic channel. Optical communications can implement low loss physical channels and high speeds. Like electrical devices, some optical devices can be used to process or filter signals, albeit optical signals. However, some optical devices can have features that are not present or not as significant in an electrical device. Further growth and implementation of optical devices in future technologies may require these features to be addressed.

SUMMARY

In one or more examples, an integrated circuit (IC) device includes a controller circuitry having an input connected to a photodiode of an optoelectronic circuitry and an output connected to a biasing circuitry, the biasing circuitry having an input connected to the output of the controller circuitry, the controller circuitry configured to transmit a transimpedance control signal code to the biasing circuitry configured to cause the biasing circuitry to offset a DC current component of the output of the photodiode.

In one or more examples, a biasing circuitry includes a plurality of banks connected to an output of a controller circuitry, the controller circuitry having an input connected to the photodiode of an optoelectronic circuitry and an output connected to the biasing circuitry, and configured to transmit a transimpedance control signal code to the biasing circuitry configured to cause the biasing circuitry to offset a DC current component of the output of the photodiode.

In one or more examples, a method for operating an integrated circuit (IC) device includes transmitting, by a controller circuitry having an input connected to a photodiode of an optoelectronic circuitry and an output connected to a biasing circuitry, a transimpedance control signal code to a the biasing circuitry having an input coupled to the controller circuitry, and offsetting, by the biasing circuitry, a DC current component of the output of the photodiode based on the transimpedance control signal code.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Examples described herein generally relate to devices and methods for a locked loop for optoelectronic elements having a current-dependent response. Generally, devices according to some examples include an electrical integrated circuit (IC) that includes an optoelectronic circuit and control circuitry. The optoelectronic circuit includes an optoelectronic element and a photodiode. The IC device may include multiple devices. In one example, the optoelectronic circuit and the control circuitry are implemented on separate devices. The optoelectronic element is configured to pass an optical signal, and the optoelectronic element has a response. In some examples, the optoelectronic element is configured to pass one or more multiple optical signals located at different wavelengths. Example optoelectronic elements include a ring modulator, a double ring filter, a Mech-Zehnder interferometer (MZI), or the like. The photodiode is disposed relative to the optoelectronic element such that at least some of the optical signal passed through the optoelectronic element is incident on the photodiode. The photodiode is connected to an input of the controller circuitry. An output of the controller circuitry is connected to an input of a digital-to-analog converter (DAC). Generally, the controller circuitry includes a transimpedance circuitry configured to amplify the current from the photodiode to a high swing voltage signal for data recovery. However, the DC output level of the transimpedance circuitry varies drastically due to its high gain and other variations. A wrong DC output level of the transimpedance circuitry degrades the transimpedance circuitry gain so a biasing circuitry is needed to offset the DC level against any variation. Moreover, the transimpedance circuitry's input current from the photodiode reflects the amount of optical power received by the photodiode, so the amount of current offset from the biasing circuitry reflects how much optical power reaches the receiver and can be used for advanced link calibration.

Embodiments herein, relate to a biasing circuitry configured to correctly offset the DC current provided by the photodiode.

Figure 1:
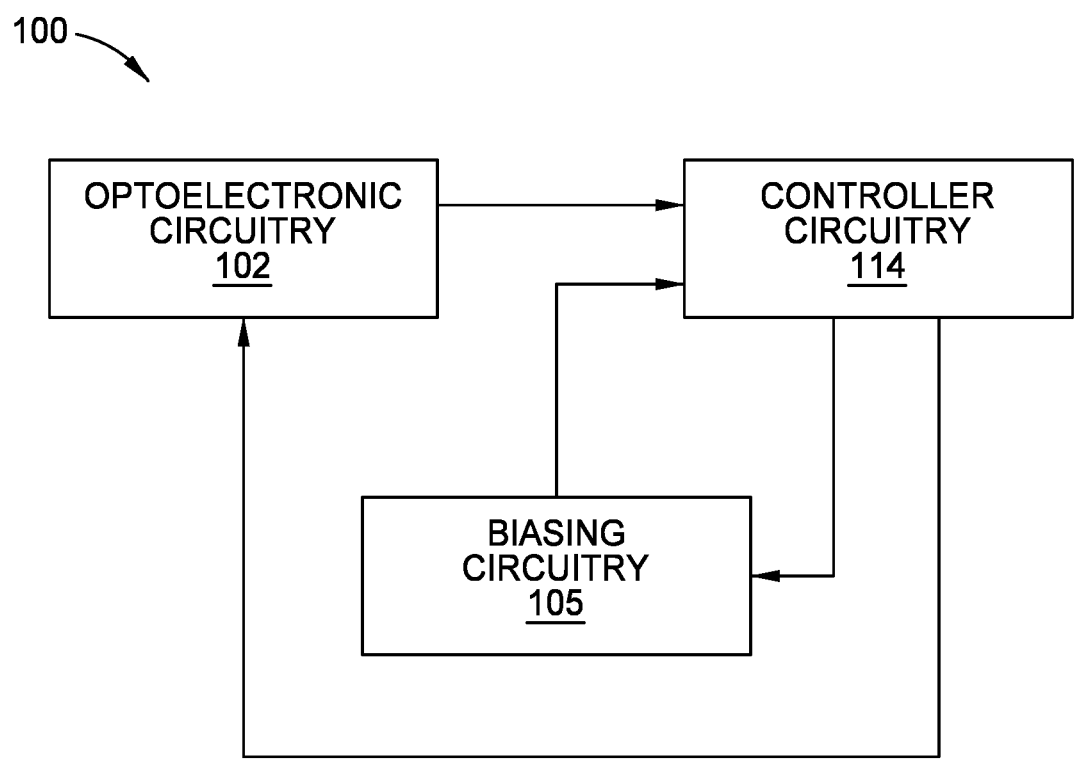
FIG. 1 illustrates an integrated circuit (IC) device according to one or more examples.

FIG. 1 illustrates an integrated circuit (IC) device 100 according to one or more examples. In one example, the IC device 100 includes an optoelectronic circuitry 102, a biasing circuitry 105, and a controller circuitry 114. The optoelectronic circuitry 102 includes any optoelectronic element configured to pass an optical signal such as a ring modulator, a double ring filter, a Mech-Zehnder interferometer (MZI), or the like.

Figure 2:
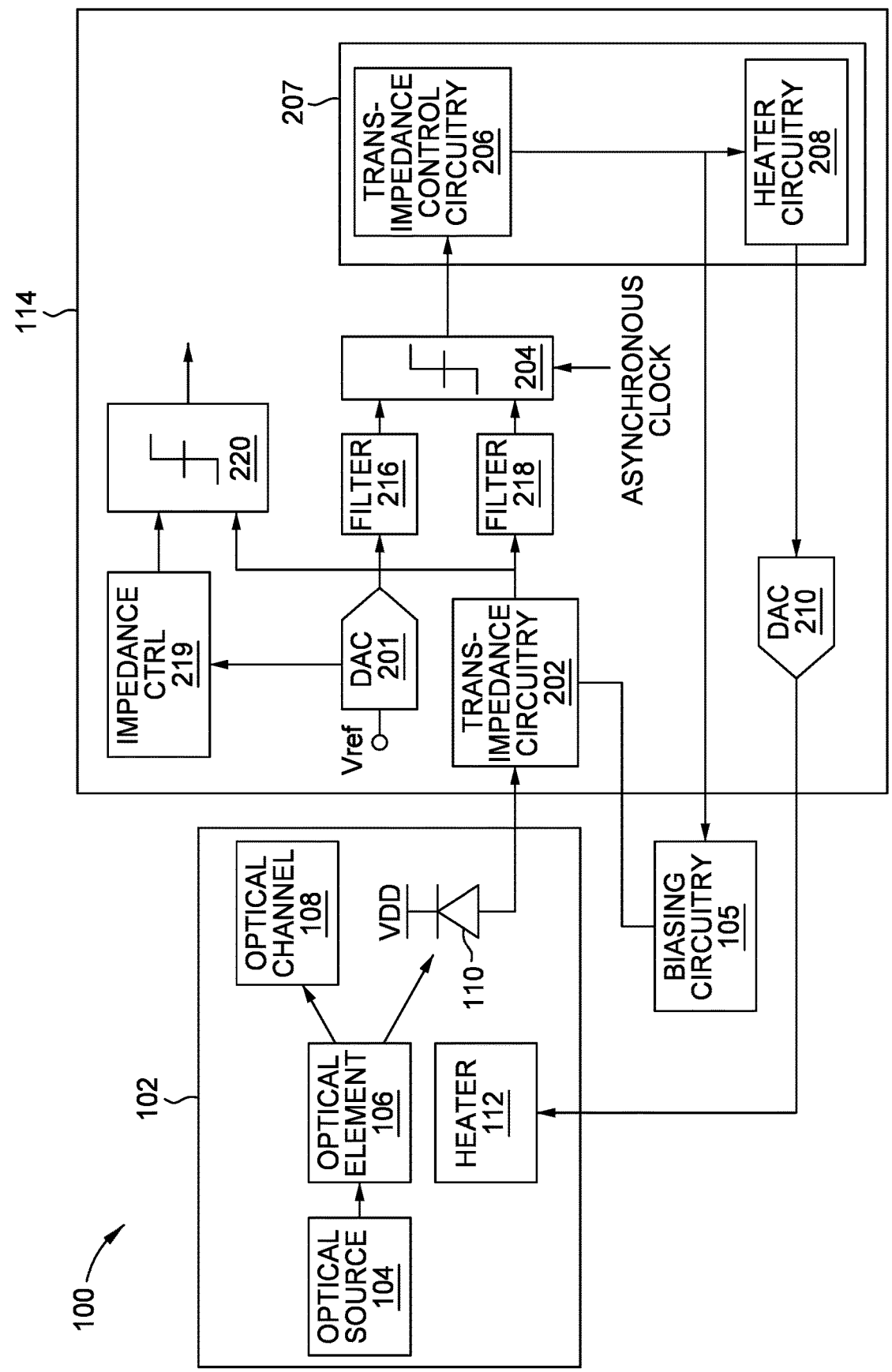
FIG. 2 is a more detailed schematic of the schematic of FIG. 1 according to one or more examples
Figure 3:
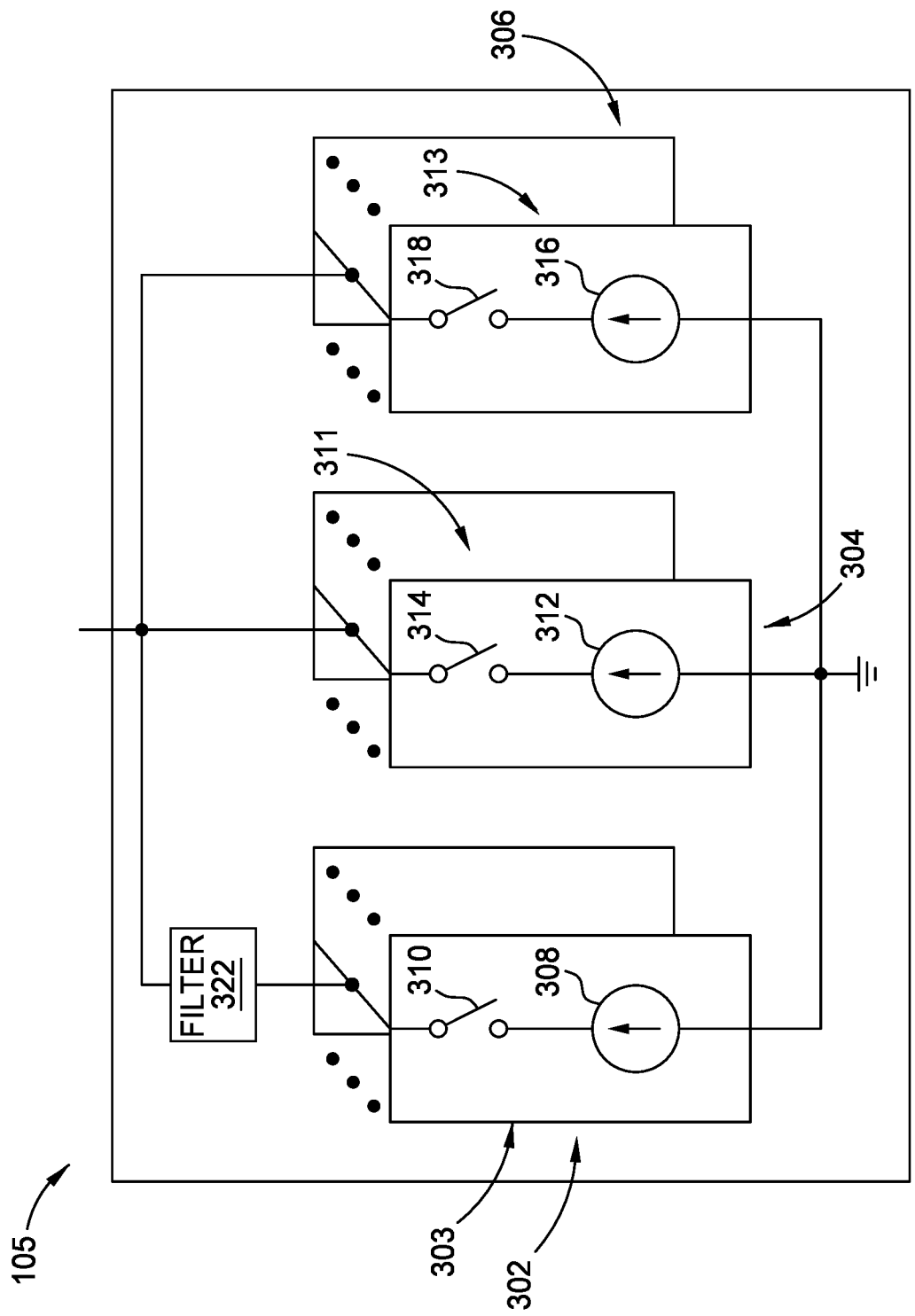
FIG. 3 illustrates an example biasing circuitry according to one or more examples.

Generally, the controller circuitry 114 generates a biasing output signal that is communicated to the biasing circuitry 105, and an output signal to the optoelectronic circuitry 102. In one example, the output signal is a heater signal that changes the temperature of a heater of the optoelectronic circuitry 102 (FIG. 2). The biasing signal is a transimpedance control signal that changes a configuration of a plurality of banks included in the biasing circuitry 105 (FIG. 3). In one example, the optoelectronic circuitry 102 generates an optical signal, and transmits the optical signal to the controller circuitry 114. The optical signal serves as an input signal provided to the controller circuitry. The controller circuitry 114, in response to the input signal, outputs a heater signal to the heater and the biasing signal to the biasing circuitry 105 based on the input signal. In response to the biasing signal, the biasing circuitry 105 changes a configuration of a plurality of banks included in the biasing circuitry 105 in order to offset a DC current included in the input signal.

FIG. 2 is a more detailed schematic of the schematic of FIG. 1 according to one or more examples. The optoelectronic circuitry 102 includes an optical source 104, an optoelectronic element 106, an optical channel 108, a photodiode 110 and a heater 112. The controller circuitry 114 includes a digital-to-analog converter (DAC) 201, a transimpedance circuitry 202, a slicer circuitry 204, a code control circuitry 207, and a DAC 210. The biasing circuitry 105 includes at least one or more banks of current drains (FIG. 3). In one example, the biasing circuitry 105 is a DAC. In one or more examples, the transimpedance circuitry 202 includes a current source, a resistor, a transimpedance amplifier, and a controllable current source (not shown).

A cathode of the photodiode 110 is electrically connected to a first power supply node (e.g., a VDD_PD node), and an anode of the photodiode 110 is coupled to the transimpedance circuitry 202, which can further be an input of the controller circuitry 114. In one example, the current source of the transimpedance circuitry 202 is electrically connected between a second power supply node (e.g., the VDD_TIA node) and the input of the transimpedance circuitry 202. The current source can be or include a current mirror biased by a static current such that the current source is configured to provide a static or constant current. The controllable current source of the transimpedance circuitry 202 is connected between the input of the transimpedance circuitry 202 and a second power supply node (e.g., a ground node).

A first input of the slicer circuitry 204 is connected to the output of a filter 218. A second input of the slicer circuitry 204 is connected to an output of a filter 216. An output of the slicer circuitry 204 is connected to an input of the code control circuitry 207. In some examples, the slicer circuitry 204 is a capture flip-flop (CapFF). An input of the filter 218 is connected to the output of transimpedance circuitry 202. The amplification performed on the input signal by the transimpedance circuitry 202 causes a high-swing voltage at the output of the transimpedance circuitry 202. Therefore, the output signal of the transimpedance circuitry 202 is provided to filter 218 for filtering. An input of the filter 216 is connected to DAC 201. An input of the DAC 201 can be electrically coupled to, e.g., a memory element (such as electrical fuses (eFuses)) that stores a digital value corresponding to a reference voltage (Vref). The reference voltage Vref can be, in some examples, VDD_TIA/2. In some examples, VDD_PD is greater than VDD_TIA. In one example, VDD_PDD is double VDD_TIA. In one example, filter 216 and filter 218 are low-pass filters. Filter 216 and filter 218 isolate the extra capacitance loading from the slicer circuitry 204, and thus extend the transimpedance circuitry 202 bandwidth, while shielding and absorbing clock kickback from the slicer 204 to the DAC 201 and transimpedance circuitry 202.

A third input of the slicer circuitry 204 is connected to an asynchronous clock. The asynchronous clock guarantees a uniform sampling, so the systematic offset from deterministic sampling can be removed. The frequency of the asynchronous clock ranges between 1 MHz and 2 GHz, for example 200 MHz.

A slicer circuitry 220 has a first input coupled to an impedance control circuitry 219 which is connected to an output of the DAC 201. The slicer circuitry 220 has a second input that is connected to an output of the transimpedance circuitry. The slicer circuitry 220 may be a capture flip-flop (CapFF) configured to sample and compare the high-swing transimpedance output against the reference voltage from the DAC 201 to provide data "0's" and "1's".

In one example, the code control circuitry 207 includes a transimpedance control circuitry 206 and a heater circuitry 208. In one example, the output of the transimpedance control circuitry 206 is connected to an input of the heater circuitry 208 and the biasing circuitry 105. The heater circuitry 208 output is connected to an input of a DAC 210. The transimpedance control circuitry 206 outputs a transimpedance control signal to the biasing circuitry 105 and the heater circuitry 208. The heater circuitry 208 outputs a heater control signal to the DAC 210 based on the transimpedance control signal. In one example, the code control circuitry 207 is connected to the controllable current source. In another example, an output of the biasing circuitry 105 is connected to a bias voltage node of the transimpedance circuitry 202.

An output of the DAC 210 is connected to an input of the heater 112. In one example, the heater 112 includes or is a resistor. The DAC 210 provides a heater signal to the heater 112 based on the heater control signal.

In operation, the photodiode 110 generates a current in response to the optical signal incident on the photodiode 110. The current generated by the photodiode 110 is received by the controller circuitry 114 at the transimpedance circuitry 202 as an input signal. The transimpedance circuitry 202 generates a voltage signal at an output of the transimpedance circuitry 202 stage based on the input signal. The slicer circuitry 204 generates a logical "1" or a logical "0" based on whether the voltage signal is greater than a reference voltage output by the DAC 201. The DAC 201 generates the reference voltage based on, e.g., the digital value stored in a memory element (not shown) communicatively coupled to the input node of the DAC 201. The reference voltage can be a static voltage, and hence, in some examples, the digital value stored in the memory element can be static. The transimpedance control circuitry 206 processes the logical "1"'s and logical "0"'s generated by the slicer circuitry 204 and outputs a transimpedance control signal code based on the logical "1"'s and logical "0"'s. In one example, the filtered DAC 201 output is connected to the negative input terminal of the slicer circuitry 204, and the filtered transimpedance circuitry 202 output is connected to the positive terminal of the slicer circuitry 204. The transimpedance control circuitry 206 compares the quantity of the logical "1's" and logical "0's." If the number of logical "1's" is greater than the number of logical "0's" the reference voltage output is greater than the voltage signal (and vice versa).

The heater circuitry 208 generates the heater control signal code based on the transimpedance control signal code. The heater circuitry 208 increases or decreases the heater control signal code based on the transimpedance control signal code. Stated differently, the heater circuitry 208 increases and decreases the heater control signal code transmitted to the DAC 210. The changes in the heater control signal code causes the DAC 210 to change the heater signal to increase or decrease the temperature provided by the heater 112 to maintain the center frequency of the optoelectronic element 106 and thus the quality of the input signal.

The transimpedance control signal code responsively adjusts the DC component of the input signal provided to the biasing circuitry 105. The DC current provided by the photodiode 110 may cause the DC voltage output of the transimpedance circuitry 202 to vary, thus hindering data recovery. The biasing circuitry 105 functions to offset (i.e., cancel out) the DC current provided by the photodiode 110.

Generally, it is assumed that if the DC current output by the photodiode 110 is properly offset, the optical signal incident on the photodiode 110 has an equal number of logical "1"s and logical "0" s. Conversely, if the number of captured logical "0"'s is, e.g., significantly greater or smaller than the number of captured logical "1" s, the DC component from the photodiode 110 does not match the DC component from the biasing circuitry 105, and thus, the DC offset saturates the transimpedance circuitry 202 output, and there is barely any useful data coming out from the transimpedance circuitry 202, causing variations in data recovery.

In one example, the biasing circuitry 105 includes a plurality of banks, with each bank corresponding to a different current value. The bits of the transimpedance control signal code are grouped by the transimpedance control circuitry 206 based on bit position. In one example, the bits of the transimpedance control signal code are grouped into least significant bits (LSBs) and most significant bits (MSBs). The quantity of banks included in the biasing circuitry 105 is equal to the number of groups the transimpedance control signal code is grouped into. For example, if the transimpedance control signal code is grouped into LSBs and MSBs, the biasing circuitry 105 includes at least two banks. As another example, the transimpedance control signal code may include a group of LSBs, MSBs, and mid-range (MIDs) bits, and the biasing circuitry 105 includes at least three banks. The MIDs are bits in the transimpedance control signal located between the LSBs and the MSBs. The number of groups, and therefore, the number of banks are not limited. The transimpedance control signal code may be divided into any number of groups. The number of bits in each group may be the same or may be different. In one example the group of LSBs includes more bits than both the group of MIDs and MSBs.

Each group of bits is provided to a corresponding bank. Each bank includes a plurality of cells. In one example, each cell includes a current drain. The plurality of cells in each group is equal to the number of bits in the corresponding group. Stated differently, each cell in a group corresponds to a specific bit of the transimpedance control signal code. For example, if an LSB group includes 64 bits, the corresponding bank will include at least 64 cells.

The biasing circuitry 105 functions to offset (i.e., cancel out) the DC current provided by the photodiode 110. Therefore, each of the cells are configured as current drains used to drain the DC current output by the photodiode 110. However, current sources can also be added if needed. Because each bit of the transimpedance control signal code corresponds to a cell in the biasing circuitry 105, each cell is activated/deactivated by the transimpedance control circuitry 206 setting/zeroing a corresponding bit of the transimpedance control signal code, respectively. When the quantity of logical "0's" and "1's" sampled by the transimpedance control circuitry 206 are equal, the DC current output of the photodiode 110 is properly drained.

Embodiments herein, are related to the code control circuitry 207 changing the transimpedance control signal code based on the quantity of logical "0's" and "1's" sampled to properly offset the DC current provided by the optoelectronic circuitry 102.

FIG. 3 illustrates an example biasing circuitry 105 according to one or more examples.

As described above, the biasing circuitry 105 includes a plurality of banks that each comprise a plurality of cells. The plurality of banks is equal to the quantity of groups that the transimpedance control circuitry 206 divides the transimpedance control signal code into, and the quantity of cells corresponds to the quantity of bits in each group. Each group may have the same or different quantity of bits. In the example illustrated in FIG. 3, the transimpedance control circuitry 206 divides in the transimpedance control signal code into three groups, LSBs, MIDs, and MSBs. Therefore, transimpedance DAC 212 includes a first bank 302, a second bank 304, and a third bank 306. The LSBs are input into the first bank 302, the MIDs are input into the second bank 304, and the MSBs are input into the third bank 306.

In one example, each of the cells are current drains used to offset DC current output by the photodiode 110. In one example, each of the cells include a current source coupled to a switch. The first bank includes 302 includes a first plurality of cells 303 including first current sources 308 and first switches 310. The second bank 304 includes a second plurality of cells 311 including second current sources 312 and second switches 314. The third bank includes 306 a third plurality of cells 315 including third current sources 316 and third switches 318.

Each of the current sources may have the same or different current values. For example, the first current sources 308 have a current value less than the second current sources 312, which have current values less than the third current sources 316. The current value of the first current sources 308 are between 0.1 µA and 1 µA, such as 0.3 uA for example. The current value of the second current sources 312 are between 0.6 µA and 6 µA such as 2 uA for example. The current value of the third current sources 316 are between 6 µA and 60 µA, such as 20 uA for example. The LSB group determines the resolution of the biasing circuitry 105, and half of the LSB determines the accuracy of the biasing circuitry 105. The MSB group determines the total range of the biasing circuitry 105. The MID group ensures that the LSB have enough margin for tracking. Each switch is activated/deactivated based on whether the corresponding bit in the transimpedance control signal code is logical "1" or a logical "0" respectively. The transimpedance control circuitry 206 searches for a configuration of the switches of the biasing circuitry 105 that results in an equal number of "0's" and "1's" so that to offset the DC current output by the photodiode 110.

In one example, the transimpedance control circuitry 206 first activates half of the first switches 310 of the first plurality of cells 303 (e.g., sets half of the LSBs of the transimpedance control signal code to logic level "1"). Then, the transimpedance control circuitry 206 then searches for the MSB, MID, and LSB in order. For example, the transimpedance control circuitry 206 causes the third switches 318 to be opened/closed until locking into a configuration, causes the second switches 314 to be opened/closed until locking into a configuration, and then causes the remaining first switches 310 to be open/closed until locking into a configuration. In one example, the current drained by the third plurality of cells 313 is greater than the second plurality of cells 311 which is greater than the first plurality of cells 303 due to the increasing current values (i.e., increasing current density) from the third current sources 316 to the first current sources 308. In other examples, the second plurality of cells 311 or the first plurality of cells 303 drain the greatest amount of current. The transimpedance control circuitry 206 changes the MSBs of the transimpedance control signal code to make larger changes in the amount of DC current offset, then changes the MIDs of the transimpedance control signal code to make smaller changes, and then changes the LSBs of the transimpedance control signal code to make fine changes until the transimpedance control circuitry 206 locks in a transimpedance control signal code that results in an equal value of logical "1's" and logical "0's" output by the slicer circuitry 204. Thus, indicating the correct amount of DC current from the photodiode 110 is offset. From there, the MSBs and MIDs are locked. During operation the transimpedance control circuitry 206 updates the LSBs to ensure the correct amount of DC current from the photodiode 110 is offset. Advantageously, this avoids the large transition glitch that may be caused by turning on/off the second plurality of cells 311 or the third plurality of cells 313. Stated differently, locking in the MSBs and MIDs guarantees a good signal to noise ratio (SNR) of the input signal. Moreover, the biasing circuitry 105 being isolated from the controller circuitry 114 minimizes extra loading, random noise, and clock kickback.

In one example, the first cells may include a filter 322. The filter 322 is located at the input of the first plurality of cells 303. The filter 322 can further reduce the transition glitch of the LSBs, and isolate the loading from the first plurality of cells 303. In one example, the filter 322 is an RC filter. Moreover, the filter 322 also filters out noise from the first plurality of cells 303. The second plurality of cells 311 and the third plurality of cells 313 have a higher current density than the first cells, so they both also provide a major current in the most cases. A higher current density results in lower noise for a same current amount, and therefore, filters are not required for the second plurality of cells 311 and the third plurality of cells 313. The higher current density also causes the biasing circuitry 105 to have lower noise than a uniform biasing circuitry design. However, in some examples, the second plurality of cells 311 and/or the third plurality of cells 313 include filters.

Figure 4:
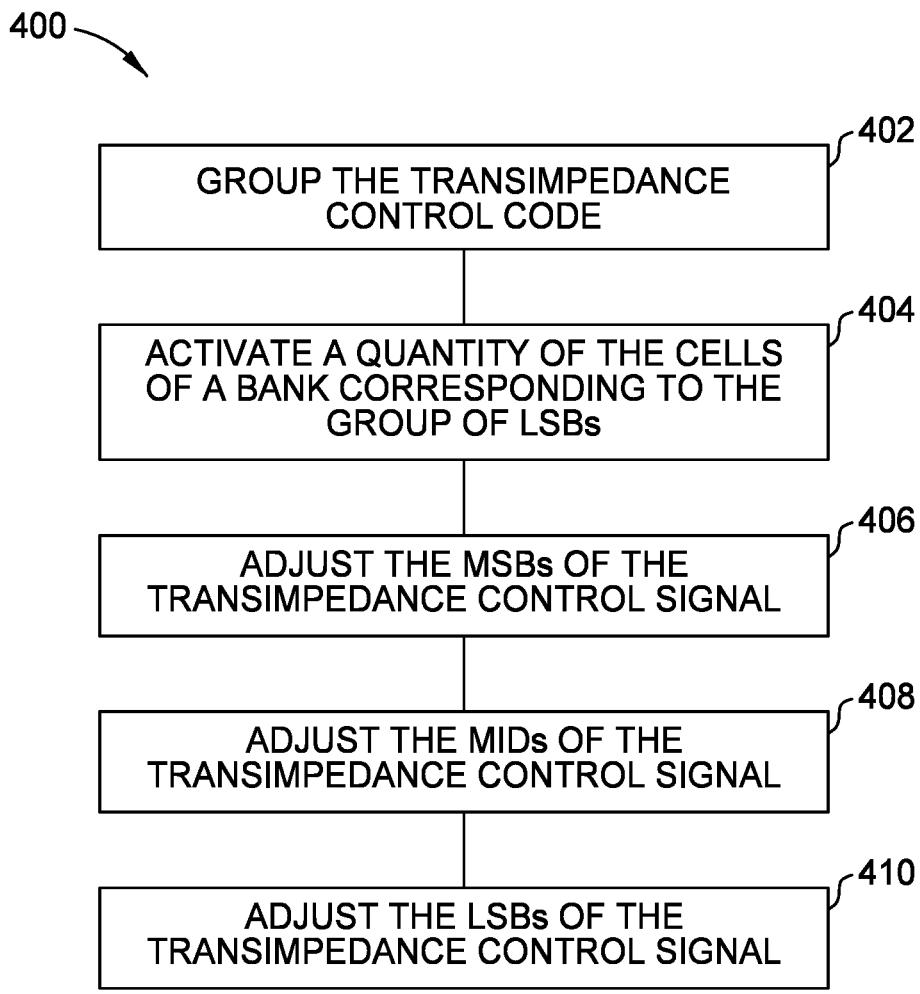
FIG. 4 illustrates a flow diagram of a method for offsetting DC current provided from an optoelectronic circuitry according to one or more examples.

FIG. 4 illustrates a flow diagram illustrating a method 400 for offsetting DC current provided from an optoelectronic circuitry 102 according to one or more examples. FIG. 4 is described with respect to FIGS. 2 and 3.

At step 402, the controller circuitry 114, groups the transimpedance control signal code into groups. Stated differently, the transimpedance control circuitry 206 groups the transimpedance control signal code that it outputs into at least two groups, a group of LSBs and a group of MSBs. However, the quantity of groups are not limited. For example, the transimpedance control circuitry may divide the transimpedance control signal code into three groups, a group of LSBs, a group of MIDs, and a group of MSBs. The biasing circuitry 105 includes a quantity of banks equal to the quantity of groups. As described above, the biasing circuitry 105 includes a first bank 302 that receives the group of LSBs, a second bank 304 that receives the group of MIDs, and a third bank 306 that receives the group of MSBs. The first bank 302 may include a first plurality of cells 303 each configured to receive one bit of the group of LSBs, the second bank 304 includes a second plurality of cells 311 each configured to receive one bit of the MIDs, and the third bank 306 includes a third plurality of cells 313 each configured to receive one bit of the MSBs.

At step 404, the controller circuitry 114 (TIA control circuitry 206) generates a transimpedance control signal code configured to activate a quantity of the cells included in a bank of the biasing circuitry 105 corresponding to the group of LSBs. In one example, the transimpedance control signal code is configured to activate half of the cells included in a bank of the biasing circuitry 105 corresponding to the group of LSBs. Stated differently, half of the first plurality of cells 303 are activated.

At steps 406-410, the controller circuitry 114 (TIA control circuitry 206) adjusts the MSBs, the MIDs, and the LSBs in sequence and locks in the MSBs, the MIDs, and the LSBs that correspond to the transimpedance control circuitry 206 receiving an equal quantity of logical "1's and logical "0's." This indicates that all of, and only, the DC current of the photodiode 110 is offset. Here, the MSBs, and MIDs remain locked and the LSBs of the transimpedance control signal code are adjusted to account for minor changes in the DC current of the photodiode 110.

What is claimed is:

1. An integrated circuit (IC) device comprising:
a controller circuitry having an input connected to a photodiode of an optoelectronic circuitry and an output connected to a biasing circuitry, the biasing circuitry having an input connected to the output of the controller circuitry, the controller circuitry configured to:
transmit a current control signal code to the biasing circuitry configured to offset a DC current component of an output of the photodiode; and
group bits of the current control signal code into a group of least significant bits (LSBs), a group of mid-range bits (MIDs), and a group of most significant bits (MSBs).

2. The IC device of claim 1, wherein the biasing circuitry comprises a plurality of banks that each comprise a plurality of cells.

3. The IC device of claim 2, wherein the plurality of cells each comprise a switch having an input connected to the controller circuitry and an output connected a current source.

4. The IC device of claim 3, wherein cells of a common bank of the plurality of banks have same current values, while cells of different banks of the plurality of banks have different current values.

5. The IC device of claim 1, wherein the biasing circuitry comprises a first bank configured to receive the group of LSBs, a second bank configured to receive the group of MIDs, and a third bank configured to receive the group of MSBs.

6. The device of claim 5, wherein the first bank comprises a first plurality of cells, the second bank comprises a second plurality of cells, and the third bank comprises a third plurality of cells.

7. The device of claim 6, wherein the first plurality of cells each comprise a first switch coupled to a first current source, the second plurality of cells each comprise a second switch coupled to a second current source, and the third plurality of cells each comprise a third switch coupled to a third current source.

8. The device of claim 7, wherein the controller circuitry is configured to:
generate a current control signal code configured to activate a quantity of the first switches in the first plurality of cells;
update the current control signal to activate or deactivate the third switches in the third plurality of cells;
after updating the current control signal to activate or deactivate the third switches in the third plurality of cells, update the current control signal to activate or deactivate the second switches in the second plurality of cells; and
after updating the current control signal to activate or deactivate the second switches in the second plurality of cells, update the current control signal to activate or deactivate the remaining switches of the first switches in the first plurality of cells.

9. A biasing circuitry comprising: a plurality of banks connected to an output of a controller circuitry, the controller circuitry having an input connected to a photodiode of an optoelectronic circuitry and the output connected to the biasing circuitry, wherein the controller circuitry is configured to: transmit a transimpedance control signal code to the biasing circuitry configured to offset a DC current component of an output of the photodiode; and group bits of the transimpedance control signal code into a group of least significant bits (LSBs), a group of mid-range bits (MIDs), and a group of most significant bits (MSBs).

10. The biasing circuitry of claim 9, wherein: the biasing circuitry comprises a first bank configured to receive the group of LSBs, a second bank configured to receive the group of MIDs, and a third bank configured to receive the group of MSBs; the first bank comprises a first plurality of cells, the second bank comprises a second plurality of cells, and the third bank comprises a third plurality of cells; and the first plurality of cells each comprise a first switch connected to a first current source, the second plurality of cells each comprise a second switch connected to a second current source, and the third plurality of cells each comprise a third switch connected to a third current source.

11. The biasing circuitry of claim 10, wherein the controller circuitry is configured to:
generate a transimpedance control signal configured to activate a quantity of the first switches in the first plurality of cells;
update the transimpedance control signal to activate or deactivate the third switches in the third plurality of cells;
after updating the transimpedance control signal to activate or deactivate the third switches in the third plurality of cells, update the transimpedance control signal to activate or deactivate the second switches in the second plurality of cells; and
after updating the transimpedance control signal to activate or deactivate the second switches in the second plurality of cells, update the transimpedance control signal to activate or deactivate the remaining switches of the first switches in the first plurality of cells.

12. A method for operating an integrated circuit (IC) device comprising:
transmitting, by a controller circuitry having an input connected to a photodiode of an optoelectronic circuitry and an output connected to a biasing circuitry, a current control signal code to the biasing circuitry having an input coupled to the controller circuitry;
grouping, by the controller circuitry, bits of the current control signal into a group of least significant bits (LSBs), a group of mid-range bits (MIDs), and a group of most significant bits (MSBs); and
offsetting, by the biasing circuitry, a DC current component of an output of the photodiode based on the current control signal code.

13. The method of claim 12, further comprising:
receiving, by a first bank of the biasing circuitry, the group of LSBs;
receiving, by a second bank of the biasing circuitry, the group of MIDs; and
receiving, by a third bank of the biasing circuitry, the group of MSBs.

14. The method of claim 13, wherein the first bank comprises a first plurality of cells, the second bank comprises a second plurality of cells, and the third bank comprises a third plurality of cells.

15. The method of claim 14, wherein the first plurality of cells each comprise a first switch coupled to a first current source, the second plurality of cells each comprise a second switch coupled to a second current source, and the third plurality of cells each comprise a third switch coupled to a third current source.

16. The method of claim 15, further comprising:
generating, by the controller circuitry, a current control signal configured to activate a quantity of the first switches in the first plurality of cells;
updating, by the controller circuitry, the current control signal to activate or deactivate the third switches in the third plurality of cells;
after updating the current control signal to activate or deactivate the third switches in the third plurality of cells, updating, by the controller circuitry, the current control signal to activate or deactivate the second switches in the second plurality of cells; and
after updating the current control signal to activate or deactivate the second switches in the second plurality of cells, updating, by the controller circuitry, the current control signal to activate or deactivate the remaining switches of the first switches in the first plurality of cells.

17. The method of claim 15, wherein a quantity of the first plurality of cells is equal to a quantity of bits in the group of LSBs, a quantity of the second plurality of cells is equal to a quantity of bits in the group of MIDs, and a quantity of the third plurality of cells is equal to a quantity of bits in the group of MSBs.

* * * * *

UNITED STATES PATENT AND TRADEMARK OFFICE
CERTIFICATE OF CORRECTION

| | |
|---|---|
| PATENT NO. | : 12,104,949 B1 |
| APPLICATION NO. | : 18/128397 |
| DATED | : October 1, 2024 |
| INVENTOR(S) | : Zhaowen Wang and Mayank Raj |

It is certified that error appears in the above-identified patent and that said Letters Patent is hereby corrected as shown below:

In the Specification

In Column 1, after Line 4, please insert the following:
--GOVERNMENT RIGHTS
This invention was made with U.S. Government support under Agreement No. HR0011-19-3-0004, awarded by Defense Advanced Research Projects Agency. The U.S. Government has certain rights in the invention.--

Signed and Sealed this
Third Day of December, 2024

Katherine Kelly Vidal
*Director of the United States Patent and Trademark Office*